Aug. 7, 1951  R. E. REESE  2,563,370
WHEEL MOUNTING
Filed Dec. 3, 1946

Raymond E. Reese,
INVENTOR.

BY Reed C. Lawlor
AGENT.

Patented Aug. 7, 1951

2,563,370

UNITED STATES PATENT OFFICE 2,563,370

WHEEL MOUNTING

Raymond E. Reese, Los Angeles, Calif.

Application December 3, 1946, Serial No. 713,788

12 Claims. (Cl. 267—60)

My invention relates to wheel mountings of the type adapted for independently supporting wheels upon a trailer or like vehicle.

A wheel mounting of the type to which my invention is particularly applicable, utilizes a guide frame which is suitable for mounting upon the frame of a vehicle, a wheel spindle, and a spindle support structure which is resiliently suspended from the frame to permit vertical movement of a wheel carried on the spindle relative to the frame as the wheel rides over a surface of varying elevation.

It is an object of my invention to provide a wheel mounting with a wheel spindle which is angularly adjustable relative to the vehicle frame.

Another object of my invention is to provide a wheel mounting having a spindle support structure resiliently suspended for vertical movement relative to a guide frame with means for angularly adjusting the spindle relative to the vertical axis.

Another object of my invention is to provide a wheel mounting having a guide frame and a spindle support structure slidably arranged thereon with an improved spring arrangement for resiliently suspending the spindle support structure from the guide frame.

Another object of my invention is to provide a wheel mounting having a spindle support structure resiliently suspended from a guide frame by means of springs with an improved means for adjustably preloading the springs.

Another object of my invention is to provide a resilient, adjustable wheel mounting which is adapted for use on either side of a vehicle.

A further object of my invention is to provide a wheel mounting having a spindle support structure slidably arranged on a guide frame with springs which resiliently suspend the structure from the frame and with overload spring means which operate when the first mentioned springs are compressed beyond the predetermined amount.

A still further object of my invention is to provide a wheel mounting with an improved means for slidably supporting the spindle support structure on the guide frame.

The foregoing objects of my invention, together with important advantages and features thereof, will become apparent from a reading of the following description taken in conjunction with the drawing in which.

Figure 1:
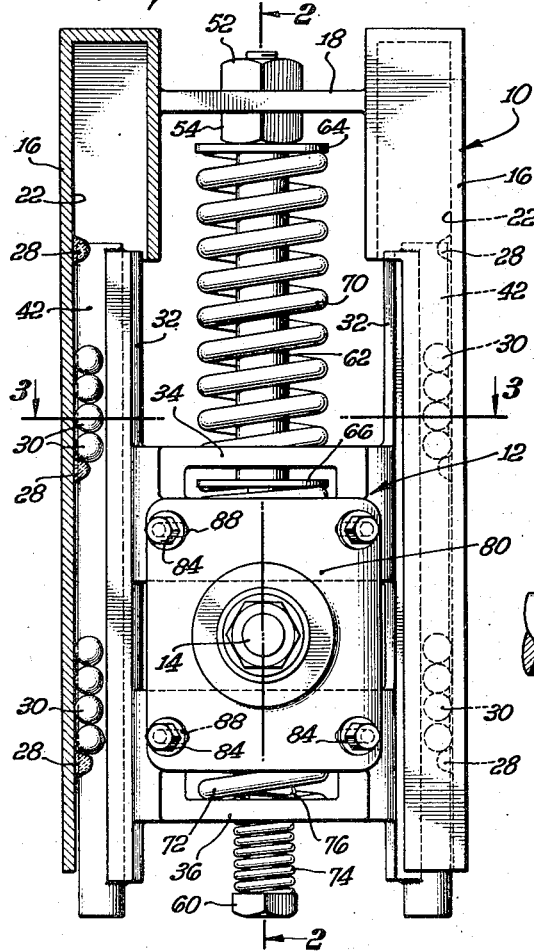
Figure 1 is an elevational view, partly in section, illustrating my improved wheel mounting.
Figure 2:
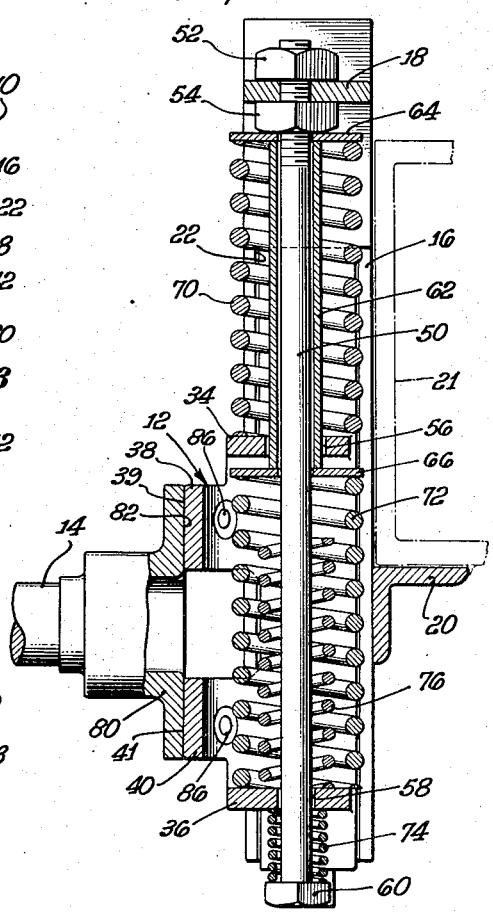
Fig. 2 is a vertical sectional view of the wheel mounting, taken on the line 2—2 of Fig. 1.
Figure 3:
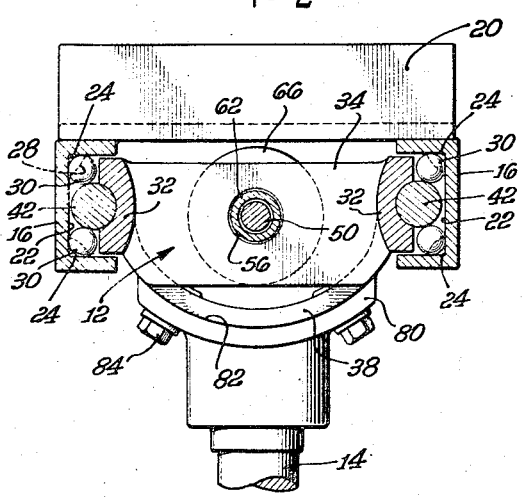
Fig. 3 is a plan view, partly in section, of the wheel mounting, taken on the line 3—3 of Fig. 1.

Referring to the drawing, there is illustrated a wheel mounting incorporating the features of my invention, and comprising a guide frame 10, a spindle support structure 12 which is resiliently supported from the guide frame and which is constrained for longitudinal sliding movements therein, and a spindle 14 which is angularly adjustable in position upon the spindle support structure.

The guide frame comprises two horizontally spaced vertical guide members 16, 16 in the form of channel-shaped guide rails rigidly secured together at their upper ends by a cross-bar 18 and at points intermediate their ends by a horizontal angle-bar 20, which is adapted to be secured to the frame 21 of a vehicle such as by welding. The guide rails 16, 16 are closed at the top and open at the bottom, and the channels 22, 22 of the guide rail face each other. The channels are of angular cross-section and are provided with front and rear corners 24, 24 in each of which a series of vertically spaced globules 28, 28 are welded. The channels are case hardened to provide long-lived races for ball bearings 30, 30 in the corners between the globules.

The spindle support structure 12 is in the form of a casting having two side bars 32, 32 interconnected by upper and lower cross-bars 34 and 36 and upper and lower arcuate bridges 38 and 40. The two bridges have external convex cylindrical surfaces 39 and 41 which would coincide if extended axially. Two case-hardened cylindrical rods 42, 42 are half embedded in the side bars 32, 32 and rigidly welded thereto.

The spindle support structure 12 is mounted upon the guide frame 10 with the guide rods 42, 42 arranged within the channels 22, 22 of the guide rails 16, 16, and are constrained therein for vertical movement by means of the ball-bearings 30, 30. Each of the ball-bearings 30 contacts the adjacent walls on opposite sides of the corner 24 in which it is located and also contacts the adjacent guide rod at a single point of the surface of the guide rod 42 which faces that corner. The resultant three point contact with the ball-bearing results in a horizontally rigid wheel mounting, which however permits free vertical movement of the spindle support structure relative to the guide frame. It is to be noted that the weld globules serve to limit the vertical movement of the ball-bearings in the channels. The three point contact arrangement of the ball-bearings also offers the advantage that if the guide rods or the walls of the channels become worn, the wheel mountings may be stiffened horizontally again by replacing the ball-bearings by others of larger diameter. Furthermore, even if the ball-bearings should contact surfaces of the side bars of the casting, these surfaces being relatively soft wear quickly and do not interfere with the action of the three point contact arrangement mentioned.

A rod or through-bolt 50 is adjustably secured to the cross-bar by means of an adjusting nut 52 and a locking nut 54. This rod extends downwardly through a relatively large circular opening 56 in the upper cross-bar 34 and a relatively small circular opening 58 in the lower cross-bar 36 of the spindle support structure 12 and carries a head 60 at the lower end thereof. A tubular member 62 encloses the upper end of the rod 50 and extends downwardly through the opening 56 in the upper cross-bar 34 to a level beneath this cross-bar. A pair of washers 64 and 66 or other laterally extending members are arranged at the opposite ends of the tubular member 62.

Four helical springs are arranged concentrically on the rod and tubular member structure. Two main springs serve to resiliently support the spindle support structure from the guide frame against any upward force acting on the spindle support structure. A third spring acts as a snubber. And a fourth spring acts to provide overload protection.

The first main spring 70 is compressed between the upper washer 64 and the upper cross-bar 34 of the spindle support structure. The second main spring 72 is compressed between the lower washer 66 and the lower cross-bar 36 of the spindle support structure. The third spring 74 which acts as a snubber is compressed between the lower cross-bar 36 and the head 60 of the through-bolt 50. The fourth or overload spring spring 76 is arranged between the lower cross-bar 36 and the lower washer 66 but is of such a length that it is normally fully extended and only comes into play when the first two springs 62 and 64 are compressed beyond a predetermined limit. The spring 76 is of smaller diameter than the second spring 72 and is arranged within it. The preliminary loading of the two main springs 70 and 72 may be varied by adjustment of the two nuts 52 and 54.

The spindle 14 is rigidly secured to and extends from a base member 80 of cylindrical shape having a concave cylindrical surface 82 of the same diameter as the convex cylindrical surfaces 39 and 41 of the bridges 38 and 40 of the spindle support structure. The spindle 14 is attached to the spindle support structure 12 with the concave cylindrical surface in contact with the convex cylindrical surfaces by means of four bolts 84, 84 which extend through bores 86, 86 in the bridge portions 38 and 40 of the casting and through four horizontally extending slots 88, 88 in the base member 80 upon which the spindle is mounted.

Preferably the axes of the cylindrical surfaces of each wheel support are inclined toward the axis of the through-bolt 50, intercepting it beneath the wheel mounting. By so inclining the cylindrical surfaces, the spindle 14 is automatically inclined to provide camber when the guide frame 10 and bracket 20 are rigidly secured at right angles to a square side of a vehicle frame.

The entire construction is symmetrical about the vertical to permit the wheel mounting to be used interchangeably between the right and left sides of a vehicle.

A plurality of wheel mountings of the type hereinabove described are welded or otherwise rigidly secured to the frame of a trailer or other vehicle with the guide frames disposed with the guide rails substantially vertical. Each spindle is then angularly adjusted about the vertical by circularly sliding of the corresponding base member upon the two bridge members and then locked in a fixed angular position by means of the bolts in order to obtain a fine toe-in adjustment of the spindles relative to the vehicle frame. The importance of providing for such an adjustment is readily appreciated if it is recalled that regardless of how accurately the guide frames are mounted upon the vehicle frame, subsequent warping of the vehicle frame causes the spindles to become misaligned. The wheel mountings hereinabove described greatly facilitate this adjustment.

With wheels mounted upon a vehicle by means of the wheel mountings hereinabove described, each of the wheels is capable of independent and rapid resilient vertical movement relative to the vertical frame in response to impulses arising from the movement of the wheels over irregular portions of the ground. When a wheel strikes a bump, it causes the corresponding wheel support structure to move upward in the guide frame against the force of the two main springs therein, and when the wheel strikes a hole in the ground, the spindle support structure falls against the corresponding snubber spring. If for any reason a very sharp upward impulse is applied to a wheel, causing the corresponding two main springs to be compressed beyond a predetermined limit or if the vehicle is carrying an excessive load, the corresponding overload spring comes into play.

From the foregoing description of my invention it will be clear that I have provided a strong, compact wheel mounting unit adapted for fine toe-in adjustment and also adapted to efficiently absorb shock on individual wheels of a vehicle. It is obvious that many modifications and variations may be made in my invention without departing from the true spirit and scope thereof. It is therefore to be understood that my invention is not confined to the specific details shown and described but only within the boundaries of the appended claims.

I claim:

1. A wheel mounting comprising a main structure adapted to be rigidly secured to a vehicle frame, said main structure comprising a pair of horizontally spaced vertical guide means and upper and lower laterally extending members; a spindle support structure provided with a second pair of horizontally spaced guide means arranged for vertical sliding movement relative to said vertical guide means, said spindle support structure having upper and lower cross-members; said cross-members being disposed on opposite sides of said lower lateral member and said upper cross-member being disposed between said lateral members; a first helical spring compressed between said upper members; and a second helical spring compressed between said lower members.

2. A wheel mounting comprising a main structure adapted to be rigidly secured to a vehicle frame, said main structure comprising a pair of horizontally spaced vertical guide means and upper and lower laterally extending members disposed between said vertical guide means; a spindle support structure provided with a second pair of horizontally spaced guide means arranged for vertical sliding movement relative to said vertical guide means, said spindle support structure having upper and lower cross-members disposed between said second guide means; said cross-members and said lateral members being alternately disposed; first spring means resiliently arranged between said upper members; and second spring means resiliently arranged between said lower members.

3. A wheel mounting comprising a main structure adapted to be rigidly secured to a vehicle frame, said main structure comprising a pair of horizontally spaced vertical guide means and upper and lower laterally extending members; a spindle support structure provided with a second pair of horizontally spaced guide means arranged for vertical sliding movement relative to said vertical guide means, said spindle support structure having upper and lower cross-members; said cross-members being disposed on opposite sides of said lower lateral member and said upper cross-member being disposed between said lateral members; a first helical spring compressed between said upper members; a second helical spring compressed between said lower members; and common means for adjustably preloading said springs.

4. A wheel mounting comprising a guide frame adapted to be rigidly secured to a vehicle frame, said guide frame having a pair of horizontally spaced vertical guide means and a cross bar at the upper end thereof, a spindle support structure provided with a second pair of horizontally spaced guide means arranged for vertical sliding movement relative to said vertical guide means, said support structure having an upper cross-member and a lower cross-member, said upper cross-member having an opening therein; a vertical member extending from said cross bar through said opening to a point beneath said opening; abutment means on said vertical member and between said two cross members; a first helical spring arranged about said vertical member for compression between said cross bar and said upper cross-member; and a second helical spring arranged for compression between said lower cross member and said abutment means.

5. A wheel mounting comprising a guide frame adapted to be rigidly secured to a vehicle frame, said guide frame having a pair of horizontally spaced vertical guide means and a cross bar at the upper end thereof; a spindle support structure provided with a second pair of horizontally spaced guide means arranged for vertical sliding movement relative to said vertical guide means, said support structure having an upper cross-member and a lower cross-member, said upper cross-member having an opening therein; a vertical member extending from said cross bar through said opening and extending to a point beneath said opening; abutment means on said vertical member and between said two cross members; a first helical spring arranged about said vertical member for compression between said cross-bar and said upper cross-member; a second helical spring arranged for compression between said abutment means and said lower cross-member; and an overload helical spring concentric with one of said first two springs and arranged to be normally fully extended and to become compressed between said support structure and said guide frame when the compression of said first two springs exceeds a predetermined amount.

6. A wheel mounting comprising a guide frame adapted to be rigidly secured to a vehicle frame, said guide frame having a cross-member at the upper end thereof and a pair of horizontally spaced vertical guide means; a spindle support structure arranged beneath said cross-member and provided with a second pair of horizontally spaced guide means cooperating with said vertical guide means to constrain said structure for vertical movement relative to said guide frame, said support structure having upper and lower cross bars having vertically aligned openings therein between said guide means; a rod supported on and depending from said cross-member through the openings in said cross bars; a tubular member enclosing the upper portion of said rod and extending to a point beneath said upper cross bar; first abutment means on the lower end of said tubular member; second abutment means on the lower end of said rod; a first helical spring arranged about said rod and compressed between said cross-member and said upper cross bar; a second helical spring arranged about said rod and compressed between said first abutment means and said lower crossbar; and a third helical spring arranged about said rod for compression between said lower cross bar and said second abutment means.

7. A wheel mounting comprising a guide frame adapted to be rigidly secured to a vehicle frame, said guide frame having a cross-member at the upper end thereof; and a pair of horizontally spaced vertical guide means; a spindle support structure arranged beneath said cross-member and provided with a second pair of horizontally spaced guide means cooperating with said vertical guide means to constrain said structure for vertical movement relative to said guide frame, said support structure having upper and lower cross-bars having vertically aligned openings therein; a rod supported on and depending from said cross-member through the openings in said cross bars; a tubular member enclosing the upper portion of said rod and extending to a point beneath the upper cross-bar; first abutment means on the lower end of said tubular member; second abutment means on the lower end of said rod; a first helical spring arranged about said tubular member and compressed between said cross-member and said upper cross bar; a second helical spring arranged about said rod and compressed between said first abutment means and said lower cross bar; a third helical spring arranged about said rod for compression between said lower cross-bar and said second abutment means; and an overload helical spring concentric with one of said first two helical springs and arranged to be normally fully extended but to become compressed when the compression of said first two springs exceeds a predetermined amount.

8. A wheel mounting comprising a guide frame adapted to be rigidly secured to a vehicle frame, said guide frame having a cross-member at the upper end thereof, and a pair of horizontally spaced vertical guide means; a spindle support structure arranged beneath said cross-member and provided with a second pair of horizontally spaced guide means cooperating wth said vertical guide means to constrain said structure for vertical movement relative to said guide frame, said support structure having upper and lower cross bars having vertically aligned openings therein; a threaded rod secured to said cross-member by an adjusting nut and depending through the openings in said cross bars; a tubular member enclosing the upper portion of said rod and extending to a point beneath the upper cross-bar; first abutment means on the lower end of said tubular member; second abutment means on the lower end of said rod; a first helical spring arranged about said tubular member and compressed between said cross-member and said upper cross bar; a second helical spring arranged about said rod and compressed between said first abutment means and said lower cross bar; and a third helical spring arranged about said rod and compressed between said lower cross bar and said second abutment means.

9. A wheel mounting comprising a guide frame adapted to be rigidly secured to a vehicle frame, said guide frame comprising a pair of laterally spaced channel-shaped vertical guide rails rigidly secured together, the channels of said guide rails having corners; a spindle support structure having a pair of guide rods disposed in the channels of the respective guide rail, means for resiliently suspending said spindle support structure for vertical movement relative to said guide frame; and a plurality of ball bearings disposed between said guide rods and said guide rails and in the corners of the channels of said guide for restricting the wheel mounting to vertical movement.

10. A wheel mounting comprising a guide frame adapted to be rigidly secured to a vehicle frame, said guide frame comprising a pair of laterally spaced channel-shaped vertical guide rails rigidly secured together, the channels of said guide rails having corners; a spindle support structure having a pair of guide rods disposed in the channels of the respective guide rails, means for resiliently suspending said spindle support structure for vertical movement relative to said guide frame; a plurality of ball bearings disposed between said guide rods and said guide rails and in the corners of the channels of said guide rails for restricting the wheel mounting to vertical movement; and stop means for limiting the vertical movement of the ball bearings during relative movement of said spindle support structure and said guide frame.

11. A wheel mounting comprising a guide frame adapted to be rigidly secured to a vehicle frame, said guide frame comprising a pair of laterally spaced channel-shaped vertical guide rails rigidly secured together, the channels of said guide rails having corners; a spindle support structure having a pair of guide rods disposed in the channels of the respective guide rails said guide rods having surfaces facing the respective corners of said channels, means for resiliently supporting said spindle support structure for vertical movement relative to said guide frame; and a plurality of ball bearings disposed between said surfaces and the adjacent corners of said channels for restricting the wheel mounting to vertical movement, each ball bearing contacting walls on opposite sides of a corner of said channel and contacting said spindle structure only at the surface of a guide rod facing that corner.

12. A wheel mounting comprising a guide frame adapted to be rigidly secured in fixed relation to a vehicle frame with its axis substantially vertical, a spindle support mounted for vertical movement in said guide frame, spring structure interconnecting said guide frame and said spindle support for cushioning said spindle support in said guide frame, said spindle support being provided with a smooth arcuate surface, a wheel spindle having a connector at one end thereof, said connector being provided with an arcuate surface that is adapted to slidably engage said first mentioned arcuate surface, said arcuate surfaces being curved about a vertical axis and being adapted for relative movement about said axis, and means engaging said spindle support and said connector for locking said arcuate surfaces together in any selected position.

RAYMOND E. REESE.

REFERENCES CITED

The following references are of record in the file of this patent:

UNITED STATES PATENTS

| Number | Name | Date |
|---|---|---|
| 774,042 | Cooper | Nov. 1, 1904 |
| 903,256 | Williams | Nov. 10, 1908 |
| 950,728 | Provot | Mar. 1, 1910 |
| 1,984,694 | Nottoli | Dec. 18, 1934 |
| 2,237,855 | Watson | Apr. 8, 1941 |
| 2,284,941 | Bergsma | June 2, 1942 |
| 2,310,821 | Wimbish | Feb. 9, 1943 |

FOREIGN PATENTS

| Number | Country | Date |
|---|---|---|
| 25,119 | France | Aug. 29, 1922 |
| 752,363 | France | July 17, 1933 |